United States Patent
Oh

[11] Patent Number: 5,943,928
[45] Date of Patent: Aug. 31, 1999

[54] LATHE CARRIAGE UNIT

[75] Inventor: Tae Moon Oh, Kyongsangnam-dong, Rep. of Korea

[73] Assignee: Daewoo Heavy Industries, Ltd., Incheon, Rep. of Korea

[21] Appl. No.: 08/998,013

[22] Filed: Dec. 24, 1997

[30] Foreign Application Priority Data

Dec. 24, 1996 [KR] Rep. of Korea ................. 96-71690

[51] Int. Cl.⁶ ............................................. B23B 21/00
[52] U.S. Cl. ........................ 82/137; 82/141; 82/153; 82/154
[58] Field of Search ................ 82/137, 133, 136, 82/141, 153, 154, 905; 192/56.1, 56.4

[56] References Cited

U.S. PATENT DOCUMENTS

| | | | |
|---|---|---|---|
| 4,733,585 | 3/1988 | Link et al. | 82/137 X |
| 4,825,992 | 5/1989 | Skrobisch | 192/56.4 |
| 5,005,452 | 4/1991 | Wood, III | 82/133 X |
| 5,349,731 | 9/1994 | Sheehan et al. | 82/141 X |
| 5,575,041 | 11/1996 | Lee | 82/153 X |

FOREIGN PATENT DOCUMENTS 2116460  9/1983  Germany ................. 82/137

*Primary Examiner*—Andrea L. Pitts
*Assistant Examiner*—Henry W. H. Tsai
*Attorney, Agent, or Firm*—Lowe Hauptman Gopstein Gilman & Berner

[57] ABSTRACT

A lathe carriage unit displaceably mounted on a bed for carrying and moving a tool post in a z-axis or x-axis direction comprises a saddle body having a guide slot extending along the length thereof and first and second bearing housings spaced apart from each other. A cross slider is slidably fitted to the guide slot of the saddle body for movement between an extended position and a retracted position. The cross slider can be caused to move by a drive mechanism into the extended or retracted position along the guide slot of the saddle body. The drive mechanism includes a ball screw rotatably supported at its opposite ends on the first and second bearing housings of the saddle body, a ball nut threadedly engaged with the ball screw and fixedly attached to the cross slider and a servo motor operatively connected to the ball screw for causing forward or reverse rotation of the ball screw. Threadedly engaged with the respective end of the ball screw, first and second pretensioning nuts tightened such that a traction force is applied to the ball screw.

7 Claims, 4 Drawing Sheets

LATHE CARRIAGE UNIT

FIELD OF THE INVENTION

The present invention relates to a carriage unit for use in a computerized numerically controlled lathe of the type slidingly movable along a lathe bed together with a tool post.

BACKGROUND OF THE INVENTION

Extensive use has been made of a computerized numerically controlled lathe whereby workpieces can be cut into a desired shape with little involvement of the operator in the cutting process. The conventional lathe includes, among other components, a bed and a carriage unit slantly mounted on the bed for sliding movement therealong relative to a workpiece held by the chuck of a spindle. The carriage unit serves as a platform for supporting a tool post which is usually composed of a turret holding a variety of cutting tools.

A z-axis servo motor is used to cause sliding movement of the carriage unit in a z-axis direction parallel to the axis of the spindle. The rotating movement of the servo motor is converted into the sliding movement of the carriage unit by a combination of z-axis ball screw and z-axis ball nut. The z-axis ball screw is rotatably journalled on the bed so that it can rotate in a forward or reverse direction depending on the direction of rotation of the servo motor coupled to one end of the z-axis ball screw. Threadedly engaged with the z-axis ball screw and fixedly secured to the carriage unit, the z-axis ball nut is adapted to displace between the opposite ends of the z-axis ball screw together with the carriage unit, in response to the forward or reverse rotation of the z-axis ball screw. Displacement of the carriage unit in the z-axis direction enables the cutting tool of the tool post to move along the length of the workpiece.

Typically, the prior art carriage unit consists of a saddle body slidably mounted on the lathe bed, a cross slider cradled on the saddle body for sliding movement in an x-axis direction substantially perpendicular to the axis of the spindle and an x-axis servo motor attached to one end of the saddle body for causing the cross slider to move in the x-axis direction. The rotating movement of the x-axis servo motor is converted into the sliding movement of the cross slider by means of a combination of x-axis ball screw and x-axis ball nut. The x-axis ball screw is rotatably journalled on the saddle body and coupled at one and to the x-axis servo motor by way of a torque limiter clutch. The x-axis ball nut is threadedly engaged with the x-axis ball screw and fixedly secured to the underside of the cross slider, whereby the x-axis ball nut and hence the cross slider are caused to displace between the opposite ends of the x-axis ball screw as the x-axis ball screw rotates in the forward or reverse direction. Displacement of the cross slider in the x-axis direction enables the cutting tool of the tool post to move toward or away from the workpiece.

A number of drawbacks are noted in accordance with the above-mentioned and other prior art carriage units. First of all, the carriage unit requires to employ a relatively large number of parts, which may result in a reduced manufacturability, a decreased structural integrity and a lowered degree of precision. Secondly, the x-axis ball screw in the carriage unit has a tendency to suffer significant change in its length and position due to the thermal expansion and the inherent weakness of the bearing housing attachment. This may adversely affect the degree of precision which has to be strictly controlled in a computerized numerically controlled lathe. The third shortcoming is that the cross slider may strike and injure the environmental parts at the end of its movement because no means is provided to restrain the overrunning movement of the cross slider.

SUMMARY OF THE INVENTION

Taking the deficiencies noted above into account, it is an object of the invention to provide a lathe carriage unit which can enjoy marked enhancement in manufacturability, structural integrity and degree of precision.

Another object of the invention resides in the provision of a lathe carriage unit capable of effectively suppressing the dimensional and positional variation of a ball screw, while forcibly restraining the range of movement of a cross slider.

In accordance with the invention, a lathe carriage unit is provided which is displaceably mounted on a bed for carrying and moving a tool post in a z-axis or x-axis direction. The lathe carriage unit comprises a saddle body having a guide slot extending along the length thereof and first and second bearing housings spaced apart from each other. A cross slider is slidably fitted to the guide slot of the saddle body for movement between an extended position and a retracted position. The cross slider can be caused to move by a drive mechanism into the extended or retracted position along the guide slot of the saddle body. The drive mechanism includes a ball screw rotatably supported at its opposite ends on the first and second bearing housings of the saddle body, a ball nut threadedly engaged with the ball screw and fixedly attached to the cross slider and a servo motor operatively connected to the ball screw for causing forward or reverse rotation of the ball screw. Threadedly engaged with the respective end of the ball screw, first and second pretensioning nuts tightened such that a traction force is applied to the ball screw.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE INVENTION

Figure 1:
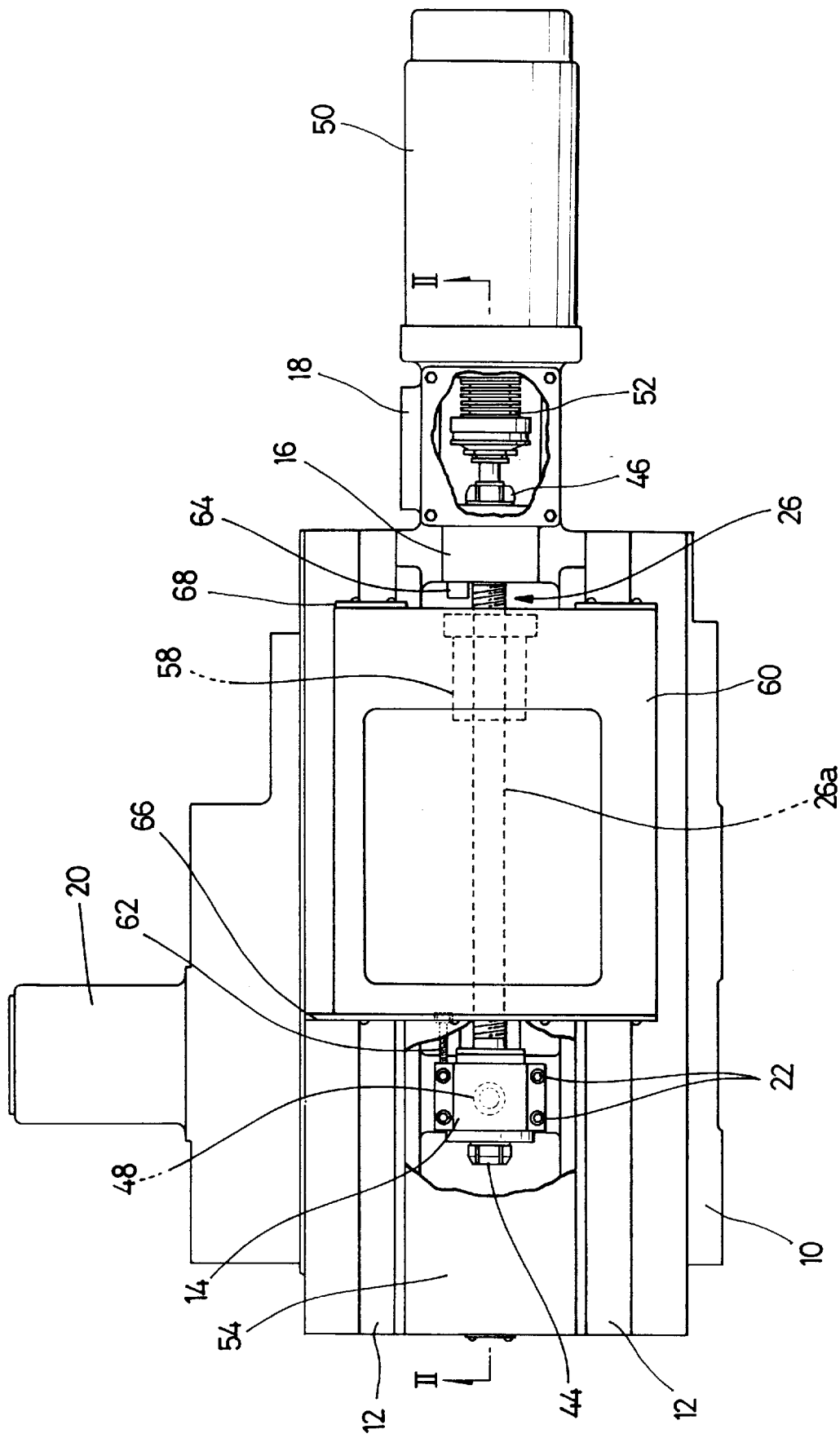
FIG. 1 is a top view showing the lathe carriage unit in accordance with the invention, with certain portions thereof removed for clarity.
Figure 2:
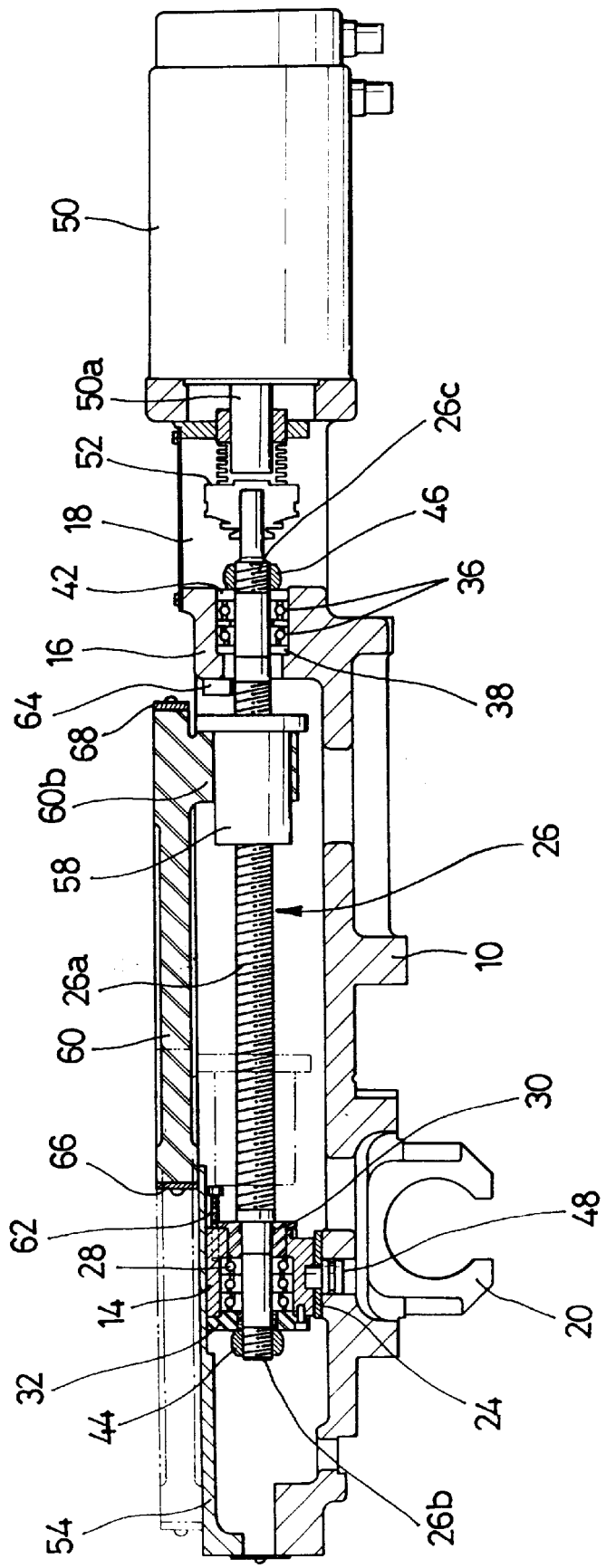
FIG. 2 is a sectional view taken along line II—II in FIG. 1 and best showing first and second bearing housings of a saddle body on which a ball screw is rotatably supported at its opposite ends.
Figure 3:
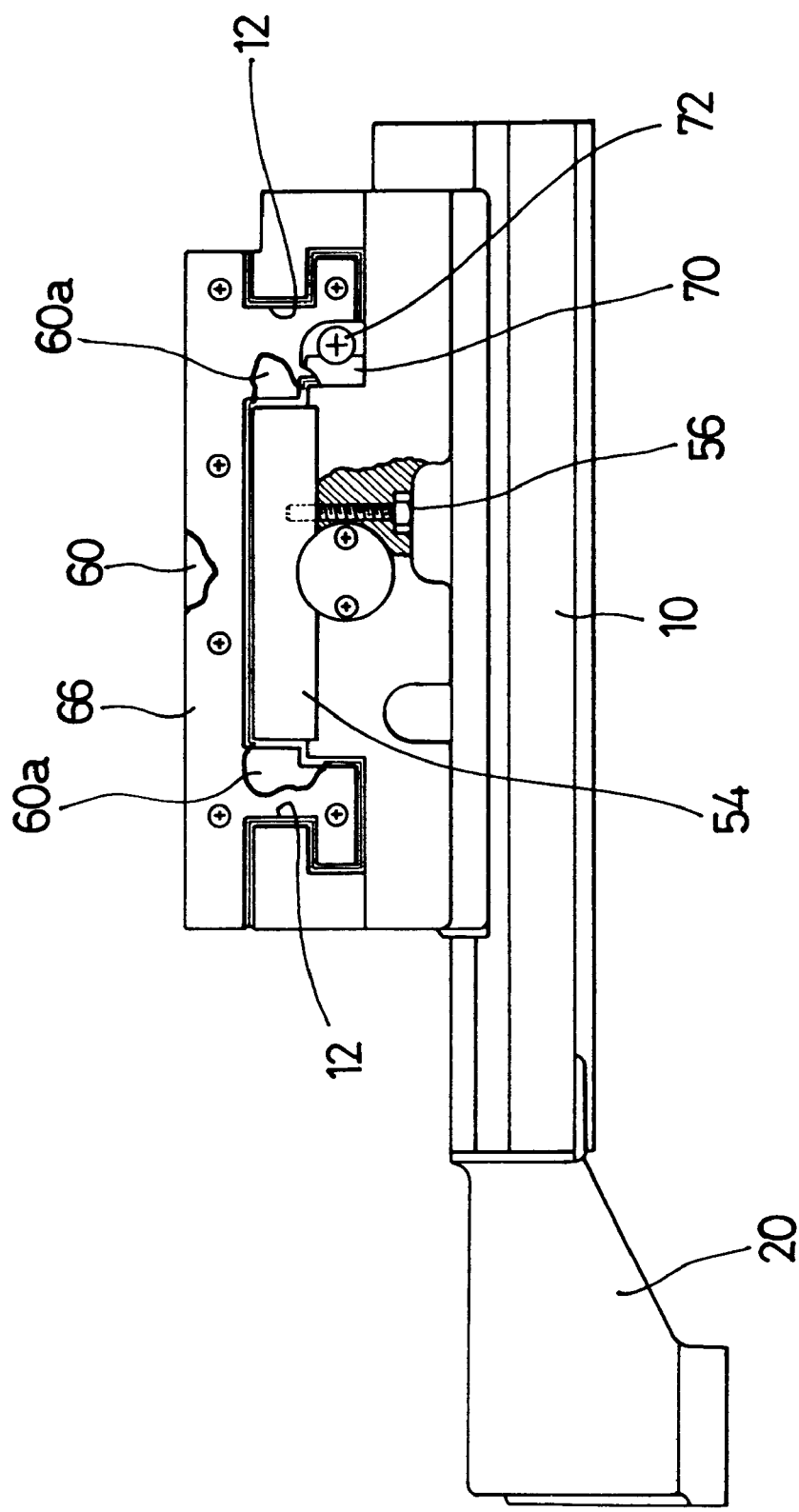
FIG. 3 is a side elevational view of the inventive lathe carriage unit best showing a blind cover fixedly secured to a saddle body with an inverted screw.

With reference to FIGS. 1 through 3, there is illustrated a lathe carriage unit embodying the present invention which can be slantly mounted on the bed (not shown) of a computerized numerically controlled lathe for sliding movement in a z-axis direction parallel to the axis of a spindle not shown in the drawings.

The lathe carriage unit includes a saddle body 10 of somewhat elongated configuration which would extend across the lathe bed when mounted in place. As is clear from FIGS. 1 and 3, the saddle body 10 has guide slots 12 extending in parallel along the substantially full length of the saddle body 10. The saddle body 10 is provided with first and second bearing housings 14, 16 arranged on a center line of the saddle body 10 in a spaced-apart relationship with each other. The saddle body 10 is further provided with a feeder box 18 integrally formed with the second bearing housing 16 and a z-axis nut holder 20 integrally formed with the underside of the saddle body 10. The feeder box 18 is configured to enclose a torque limiter clutch set forth later, whereas the z-axis nut holder 20 is adapted to hold a z-axis ball nut not shown in the drawings which remains threadedly engaged with a z-axis ball screw (also not shown). It is known in the art that the combination of z-axis ball nut and z-axis ball screw is utilized to move the lathe carriage unit as a whole in a z-axis direction.

Figure 4:
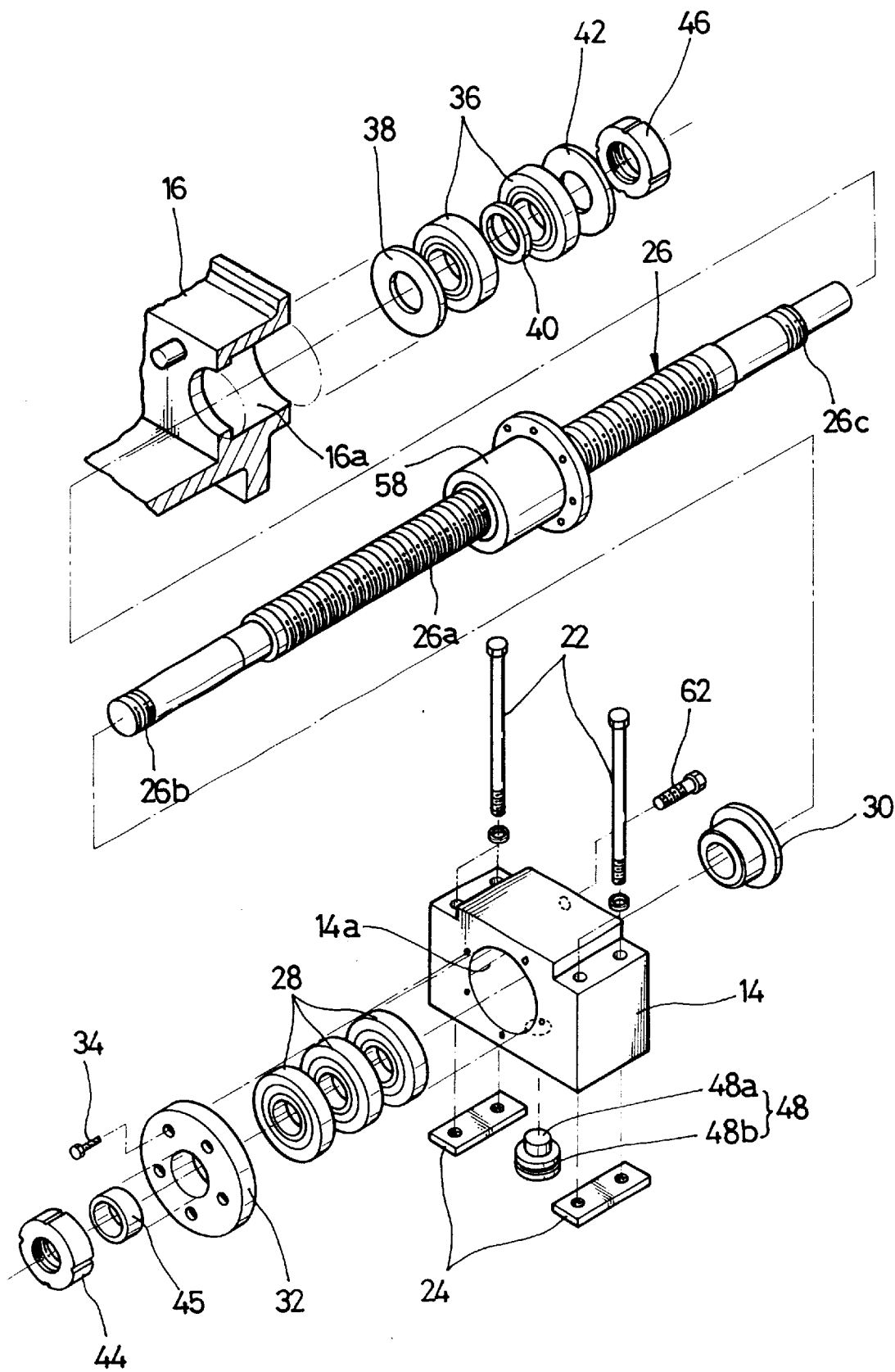
FIG. 4 is an exploded perspective view showing a ball screw, journal bearings, pretensioning nuts and a thrust key, employed in the inventive lathe carriage.

Referring to FIG. 2 and particularly to FIG. 4, it can be appreciated that the first bearing housing 14 has a bore 14a and is demountably attached to the saddle body 10 by screws 22, with a couple of levelling shims 24 sandwiched between the first bearing housing 14 and the saddle body 10. The shims 24 are of varying thickness so that the elevation of the first bearing housing may be adjusted by replacing the shims 24 with the ones of different thickness. Unlike the first bearing housing 14, the second bearing housing 16 is integrally formed with the saddle body 10 and has a stepped bore 16a in alignment with the bore 14a of the first bearing housing 14.

An x-axis ball screw 26 is rotatably supported on the first and second bearing housings 14, 16 at its opposite ends. The x-axis ball screw 26 has a middle screw thread 26a of relatively large pitch formed along its middle extension and first and second terminal threads 26b, 26c of far smaller pitch than the middle screw thread 26a. One end of the x-axis ball screw 26 is inserted through the bore 14a of the first bearing housing 14 and rotatably supported on an array of journal bearings 28 which are retained in the bore 14a by means of inner and outer retainer rings 30, 32. The outer retainer ring 32 is affixed to the first bearing housing 14 by virtue of a screw 34. The other end of the x-axis ball screw 26 is inserted through the stepped bore 16a of the second bearing housing 16 and rotatably supported on a pair of journal bearings 36 which are retained in the stepped bore 16a by means of inner, intermediate and outer retainer rings 38, 40, 42.

It should be noted that first and second pretensioning nuts 44, 46 are threadedly engaged with the first and second terminal threads 26b, 26c of the ball screw 26. In between the first pretensioning nut 44 and the journal bearing 28, a collar 45 is disposed so as to pass through the outer retainer ring 32. Each of the first and second pretensioning nuts 44, 46 is tightened such that a traction force great enough to pretension the ball screw can be applied to the opposite ends of the ball screw 26. This assures that the dimensional variation of the ball screw 26 due to its thermal expansion is minimized, thus maintaining the degree of precision or accuracy of moving parts throughout the operating process of the lathe carriage unit.

A cylindrical thrust key 48 is used to reinforce the mounting structure of the first bearing housing 14, as best seen in FIGS. 2 and 4. The thrust key 48 has a base 48b of large diameter fitted through the saddle body 10 at a position just underneath the first bearing housing 14 and a head 48a of small diameter protruding into engagement with the first bearing housing 14. In combination with the screws 22, the thrust key 48 plays an important role in maintaining the first bearing housing 14 in an exact mounting position against the thrust force applied to the first bearing housing 14 during rotation of the ball screw 26.

Attached to the feeder box 18 is an x-axis servo motor 50 whose output shaft 50a is drivingly associated with the ball screw 26 via a torque limiter clutch 52 housed in the feeder box 18. The servo motor 50 can rotate in an accurately controlled manner in response to the command signals supplied from a lathe controller (not shown), thereby causing the ball screw 26 to rotate in a forward or reverse direction. The role that the torque limiter clutch 52 plays is to disconnect the power delivery between the servo motor 50 and the ball screw 26 when the torque exerting on the ball screw 26 exceeds a predetermined upper limit, protecting the servo motor 50, the ball screw 26 and other moving parts.

At the opposite end of the saddle body 10 from the servo motor 50, a blind cover 54 is removably attached to the saddle body 10 so that it can run over the first bearing housing 14 to prevent chips and cutting fluid from ingressing into the space provided around the first bearing housing 14. As can be seen in FIG. 3, the blind cover 54 is secured to the saddle body 10 by an inverted screw 56 which passes through the thickness of the saddle body 10 and threadedly engages with the blind cover 54. This makes it possible to eliminate any recesses or protrusions that would be left on the top surface of the blind cover 54 in case a screw is driven into the saddle body 10 from the top surface of the blind cover 54.

Referring to FIGS. 1, 2 and 3, it can be seen that an x-axis ball nut 58 is threadedly engaged with the screw thread 26a of the ball screw 26 and that a cross slider 60 for holding a tool post (not shown) is slidably mounted on the saddle body 10 for sliding movement between an extended position and a retracted position in the x-axis direction. The cross slider 60 has a pair of legs 60a which are slidingly fitted to the guide slots 12 of the saddle body 10, as clearly shown in FIG. 3, and an x-axis nut holder 60b projecting downwards from the underside of the cross slider 60 to hold the x-axis ball nut 58 in place, as noted in FIG. 2. Accordingly, forward rotation of the ball screw 26 will cause the ball nut 58 and the cross slider 60 to move into the extended position as shown in a double-dotted chain line in FIG. 2, while reverse rotation of the ball screw 26 will bring the ball nut 58 and the cross slider 60 back to the retracted position as illustrated in a solid line in FIG. 2.

As shown in FIGS. 1 and 2, the first bearing housing 14 has a stopper bolt 62 adapted to abut with the ball nut 58 when the cross slider 60 moves past the extended position. The second bearing housing 16 is provided with a stopper ledge 64 which can abut with the ball nut 58 as the cross slider 60 moves past the retracted position. The stopper bolt 62 and the stopper ledge 64 serve to inhibit "overrunning" of the ball nut 58 and the cross slider 60 which would otherwise cause damages of the parts of the lathe carriage unit.

Referring finally to FIGS. 2 and 3, it can be appreciated that a front wiper 66 with rubber blade is bolted to the front end of the cross slider 60. The general profile of the front wiper 66 corresponds to the front end shape of the cross slider 60, meaning that the chips and cutting fluid dropped on the guide slot 12 of the saddle body 10 are wiped out by the front wiper 66 as the cross slider 60 moves into the extended position. Bolted to the rear end of the cross slider 68 is a rear wiper 68 that performs substantially the same function as the front wiper 66 does.

As shown exclusively in FIG. 3, a jib or wedge 70 is attached to one of the legs 60a of the cross slider 60 by a carrier bolt 72 such that, upon tightening or loosening of the carrier bolt 72, the jib 70 can be driven into or out of the clearance left between the leg 60a of the cross slider 60 and the central land of the saddle body 10.

In operation, the servo motor 50 begins to turn in the forward direction as it receives the corresponding command signals from the lathe controller. The torque of the servo motor 50 is delivered to the ball screw 26 via the torque limiter clutch 52, causing the ball screw 26 to rotate in the forward direction. Forward rotation of the ball screw 26 enables the cross slider 60 to move toward the extended position as shown in a double-dotted chain line in FIG. 2. At the extremity of such extending movement, the ball nut 58 comes into striking contact with the stopper bolt 62 whereby further forward rotation of the ball screw 26 is retarded due to the immobility of the ball nut 58, at which moment the torque limiter clutch 52 acts to disconnect power delivery between the servo motor 50 and the ball screw 26.

Reverse rotation of the servo motor 50 and the ball screw 26 enables the cross slider 60 to move away from the extended position and then into the retracted position as shown in a solid line in FIG. 2. At the extremity of such retracting movement, the ball nut 58 comes into striking contact with the stopper ledge 64 whereby further reverse rotation of the ball screw 26 is inhibited due to the immobility of the ball nut 58, at which time the power delivery between the servo motor 50 and the ball screw 26 is disconnected by the torque limiter clutch 52.

While the invention has been shown and described with reference to a preferred embodiment, it should be apparent to one of ordinary skill in the art that many changes and modification may be made without departing from the spirit and scope of the invention as defined in the claims.

What is claimed is:

1. A lathe carriage unit, comprising:
    a saddle body having a guide slot extending along the length of the saddle body and a first bearing housing and a second bearing housing spaced apart from each other, said saddle body further including a blind cover for covering the first bearing housing, said blind cover being detachably secured to the saddle body with an inverted screw passing through a thickness of the saddle body and threadedly engaging with the blind cover;
    a cross slider slidably fitted to the guide slot of the saddle body for movement between an extended position and a retracted position;
    a drive mechanism for causing the cross slider to move into the extended or retracted position along the guide slot of the saddle body, said drive mechanism including a ball screw rotatably supported at its opposite ends on the first and the second bearing housings of the saddle body, a ball nut threadedly engaged with the ball screw and fixedly attached to the cross slider and a servo motor operatively connected to the ball screw for causing the ball screw to rotate in a forward or reverse direction; and
    first and second pretensioning nuts threadedly engaged with the respective end of the ball screw and tightened such that a traction force is applied to the ball screw.

2. The lathe carriage unit as recited in claim 1, wherein the first bearing housing is removably attached to the saddle body, the second bearing housing integrally formed with the saddle body.

3. The lathe carriage unit as recited in claim 2, further comprising a thrust key having a base fitted through the saddle body and a head protruding into engagement with the first bearing housing.

4. The lathe carriage unit as recited in claim 2, wherein the saddle body is further provided with a feeder box integrally formed with the second bearing housing and a z-axis nut holder integrally formed with the saddle body below the first bearing housing.

5. The lathe carriage unit as recited in claim 1, wherein the cross slider has an x-axis nut holder integrally formed therewith to hold the ball nut of the drive means in place.

6. The lathe carriage unit as recited in claim 1, wherein the first bearing housing has a stopper bolt adapted to abut with the ball nut when the cross slider moves past the extended position and wherein the second bearing housing has a stopper ledge adapted to abut with the ball nut as the cross slider moves past the retracted position.

7. The lathe carriage unit as recited in claim 1, wherein the drive mechanism further includes a torque limiter clutch operatively connecting the servo motor to the ball screw in a manner that the torque of the ball screw inhibited from increasing beyond a preselected upper limit.

* * * * *